(12) United States Patent
Amit et al.

(10) Patent No.: US 6,259,538 B1
(45) Date of Patent: *Jul. 10, 2001

(54) REAL-TIME FACSIMILE GATEWAY

(75) Inventors: Rami Amit, Herzelia; Shmulik Bachar, Holon; Alon Cohen, Rison Le-Zion, all of (IL)

(73) Assignee: Vocaltec Communications Ltd., Herzliya (IL)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/006,637

(22) Filed: Jan. 13, 1998

(51) Int. Cl.[7] ..................................................... H04N 1/32
(52) U.S. Cl. .......................... 358/442; 358/407; 358/434; 358/468; 379/100.15; 379/100.17
(58) Field of Search ..................................... 358/402, 407, 358/442, 468, 400, 406, 409, 434, 435, 438, 439

(56) References Cited

U.S. PATENT DOCUMENTS

| | | | |
|---|---|---|---|
| 4,970,603 | * 11/1990 | Kanai | 358/400 |
| 5,432,907 | 7/1995 | Picazo, Jr. et al. | 395/200 |
| 5,490,247 | 2/1996 | Tung et al. | 395/162 |
| 5,805,298 | * 9/1998 | Ho et al. | 358/402 |
| 5,835,240 | * 11/1998 | Kobayashi et al. | 358/468 |
| 5,835,579 | 11/1998 | Gersi et al. | 379/100.17 |

FOREIGN PATENT DOCUMENTS

WO 97/10668 * 3/1997 (WO).

OTHER PUBLICATIONS

Dialogic Native NT Architecture –Beta 1 Reference.
MSI/SC Software Reference for Windows NT.

* cited by examiner

Primary Examiner—Edward Coles
Assistant Examiner—Mark Wallerson
(74) Attorney, Agent, or Firm—Darby & Darby

(57) ABSTRACT

A facsimile gateway provides fax transmission over a packetized network. To accommodate packet delay in the network, an alternate protocol source provides the appropriate notifications to the originating fax machine. In one embodiment, the gateway is constructed using conventional class II or 2.0 fax/modems and voice processing boards. The fax board provides most of the fax gateway operations. As needed, the voice board is switched into the call to provide notifications to prevent a time-out in the originating fax machine.

31 Claims, 5 Drawing Sheets

REAL-TIME FACSIMILE GATEWAY

FIELD OF THE INVENTION

The present invention relates to facsimile transmissions and, more specifically, to a facsimile gateway for routing facsimile messages in real-time over packet-based networks.

BACKGROUND OF THE INVENTION

Traditionally, facsimile ("fax") machines transmitted fax messages over the public switching telephone network ("PSTN"). The PSTN provides end-to-end connections between each fax machine. That is, for each call through the PSTN, there is a dedicated circuit set up between the two machines through which the date streams for the call are sent, For many types of data traffic, Fe PSTN is a relatively inefficient transmission medium because it is circuit-based. To provide a connection whenever a caller desires one, the PSTN must be designed to handle the maximum amount of traffic that may flow through the network. Thus, at non-peak times, the network is underutilized. This is especially true for fax transmissions because most of the traffic flows from the originating fax to the destination fax, Typically, minimal traffic (e.g., a few signaling messages) flows in the other direction during the call.

Other networks have been developed to overcome the disadvantages of the PSTN. Some of the most prevalent alternative networks are packet-based networks. Packet-based networks such as the Internet provide more efficient data transmission by subdividing the data stream into blocks of data (referred to as data packets) and routing the data packets through the packet network. Significantly, the packet network does not provide a dedicated connection for each call, Rather, the packets associated with a given call may be routed at different times and through different nodes of the packet network. By breaking up the traffic in this manner, the switching and routing resources of the packet network are used more efficiently in comparison to comparable resources in the PSTN.

Although a packet network may be more efficient, the network may cause some of the traffic associated with a call to be delayed. This delay may cause problems in facsimile transmissions because conventional fax machines are designed to wait for a specific period of time for acknowledgments from the receiving fax machine, For example, an acknowledgment may be sent to indicate that the fax message was received in its entirety. If the originating fax machine does not receive an acknowledgment within the specified period of time, the originating fax machine may abort the transmission.

One proposed solution to this problem involves establishing two fax sessions. One fax session is established between the originating fax machine and its gateway to the packet network. Another fax session is established between the receiving fax machine and its gateway to the packet network, The gateways, in turn, communicate with one another over the packet network.

To compensate for delays in the packet network, the gateways provide acknowledgments and other handshaking signals to their associated fax machines, as necessary. For example, to prevent a time-out by an originating fax machine, its gateway may send an acknowledgment to the originating fax machine before the receiving fax machine successfully receives the complete fax message. It is left to the gateway to try to ensure that the fax message is successfully transmitted. To this end, the gateway typically stores the fax message and forwards it to the receiving fax machine at a later point in time. In the event that the fax message could not be successfully transmitted, recovery measures must be invoked to retransmit the fax message.

These recovery procedures may be cumbersome and inefficient. Thus, a need exists for a more transparent method of sending fax messages and receiving confirmations or error reports in real-time over packet-based networks.

SUMMARY OF THE INVENTION

The invention relates to a real-time gateway for a packet-based network fax transmission system. The gateway enables conventional fax machines to withstand transmission delays in the packet network. This is accomplished by intercepting the confirmation message that typically is generated by the conventional fax/modem in the gateway and by confirming that an entire fax message has been received only after the confirmation has been received from the receiving fax machine.

Typically, the gateway uses a fax/modem and adio board combination to interface with the originating fax machine. For example, a switch connects the line from the originating fax machine to either a fax/modem or an audio board. To enable the fax/modem to process inbound and outbound fax messages, the switch connects the line to the fax/modem. However, after an entire fax message (i.e., all of the pages in the fax) has been sent, the switch disconnects the fax/modem from the line and connects the audio board to the line, This prevents the fax/modem from sending a confirmation to the originating fax machine. The originating gateway (i.e., the gateway connected to the originating fax machine) then waits for the confirmation from the receiving fax machine via the packet network and the receiving gateway. If the confirmation is received, the audio board sends a confirmation message to the originating fax machine.

In one embodiment, the gateway is implemented using off-the-shelf PSTN interface boards, packet network interface boards, fax/modems and audio boards. The PSTN and packet network boards process fax calls to and from the PSTN, provide protocol conversion, as necessary, and provide packet network interface operations. The fax/modems provide the fax message processing and provide an interface to determine when the entire fax message has been sent The audio boards provide the message that emulates the confirmation message sent by the receiving fax machine.

Thus, a system for providing facsimile transmission over a packet-based network includes a standard fax/modem for providing facsimile protocol processing for the messages, an audio board for providing facsimile protocol messages to a facsimile machine, a switch or other mechanism for routing traffic associated with the facsimile machine to or from either the fax/modem or the audio board, and a controller for monitoring the facsimile messages and controlling the switch or other mechanism according to the monitoring operation.

BRIEF DESCRIPTION OF THE DRAWINGS

These and other features of the invention will become apparent from the following description and claims, when taken with the accompanying drawings, wherein similar references characters refer to similar elements throughout and in which:

DESCRIPTION OF EXEMPLARY EMBODIMENTS

Figure 1:
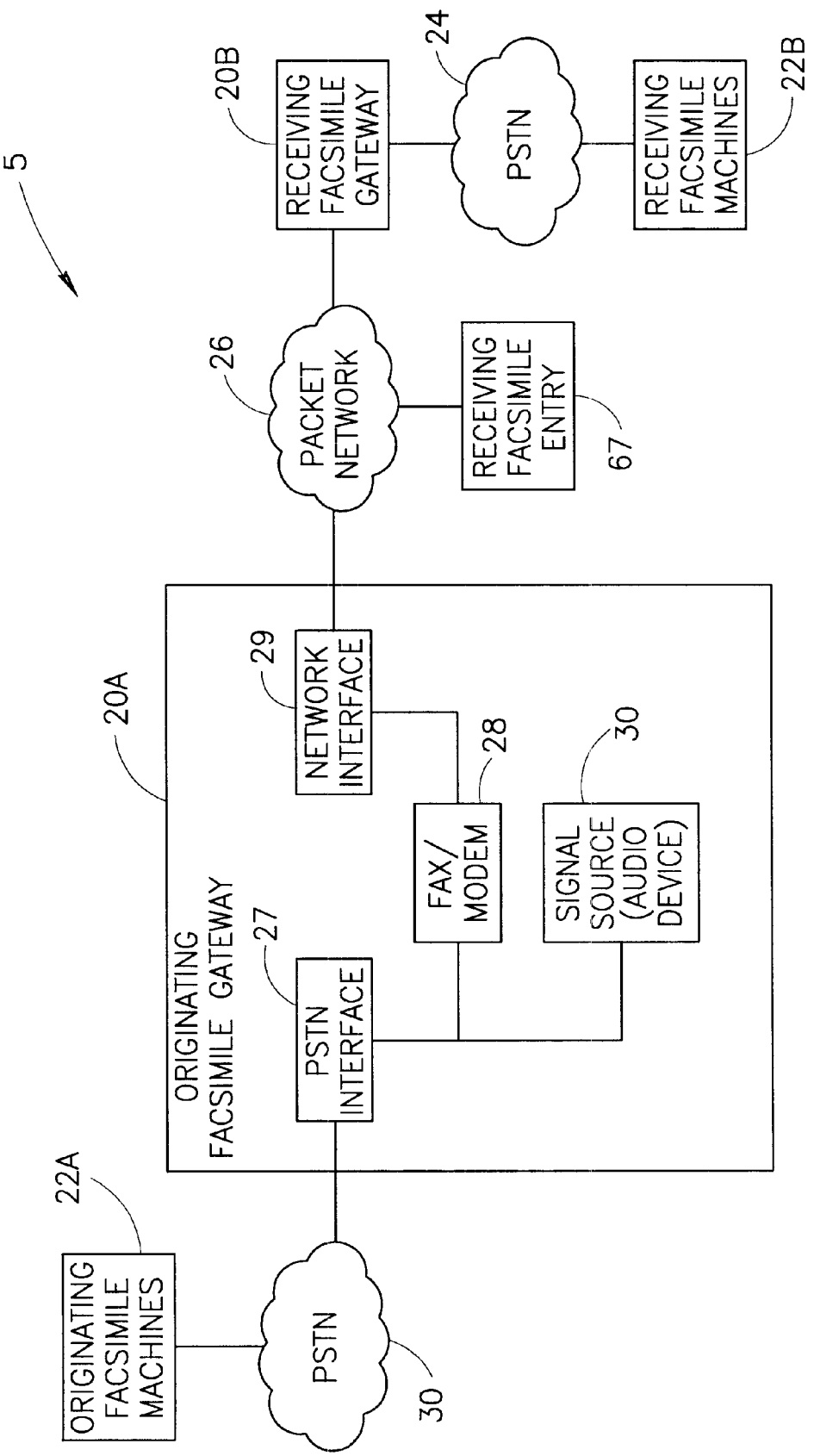
FIG. 1 is a block diagram of one embodiment of a facsimile transmission system constructed according to the invention.

FIG. 1 illustrates a facsimile transmission system S that incorporates real-time facsimile gateways 20 according to the invention. An originating fax machine 22A (left) transmits fax messages to a receiving fax machine 22B. The fax machines 22 are connected to a conventional PSTN 24. To route the messages over a packet-based network 26, the system S includes facsimile gateways 20 that provide an interface between the PSTN 24 and the packet network 26. Thus, the gateways 20 allow faxes generated on the PSTN 24 to be sent over the packet network 26, and vice versa.

For example, a fax message from the originating fax machine 22A is muted to the PSTN 24 and then to an originating facsimile gateway 20A. The gateway 20A includes a PSTN interface 27, a network interface 29, a fax/modem 28 and a signal source 30 (e.g., an audio device). The PSTN interface 27 and network interface 29 provide the necessary message processing and protocol conversion to interface to the PSTN 24 and packet network 26, respectively. The fax/modem 28 in the gateway 20A processes the fax message to provide the data that is sent to the network interface 29, The packets are sent over the packet network 26 to a receiving facsimile gateway 20B and, from there, the packets are sent to the receiving fax machine 22B via the PSTN 24.

Typically, the receiving facsimile gateway 20B provides appropriate message processing to convert the packets to PSTN-based signals for transmission on the PSTN 24. The receiving facsimile gateway 20B also may be a gateway to another network (not shown) or to other receiving facsimile entitles (e.g., entity 67) that can display or store a facsimile message and confirm the delivery of the facsimile message. To reduce the complexity of FIG. 1, the details of the gateway 20B are not illustrated.

To provide the appropriate confirmations to the originating facsimile machine 22A, the receiving fax machine 22B sends messages to the originating fax machine 22A through the PSTN 24 and the packet network 26 in a similar manner as discussed above.

Typically, the fax/modem 28 supports Class II, 2.0 or above fax messages. Thus, the protocol messages between the fax machines 22 include an acknowledgment that an entire document was received. Due to the delays in the packet network 26 and processing delays in the, receiving fax machine 22B, the time it takes for an acknowledgment to reach the originating facsimile gateway 20A may exceed the time-out period 25 (FIG. 2) of the fax/modem 28 in the originating facsimile gateway 20A. In conventional fax/modems, if the time-out period 25 is exceeded, the fax/modem 28 may be configured to disconnect the line to the originating fax machine 22A (to indicate the failure) or to send a "false acknowledgment" (line 37A, FIG. 2). In accordance with the invention, to overcome problems associated with these time-out procedures, the originating facsimile gateway 20A disconnects the fax/modem 28 from the originating fax machine 22A and the signal source 30 provides a substitute confirmation. These operations are treated in detail below.

Figure 2:
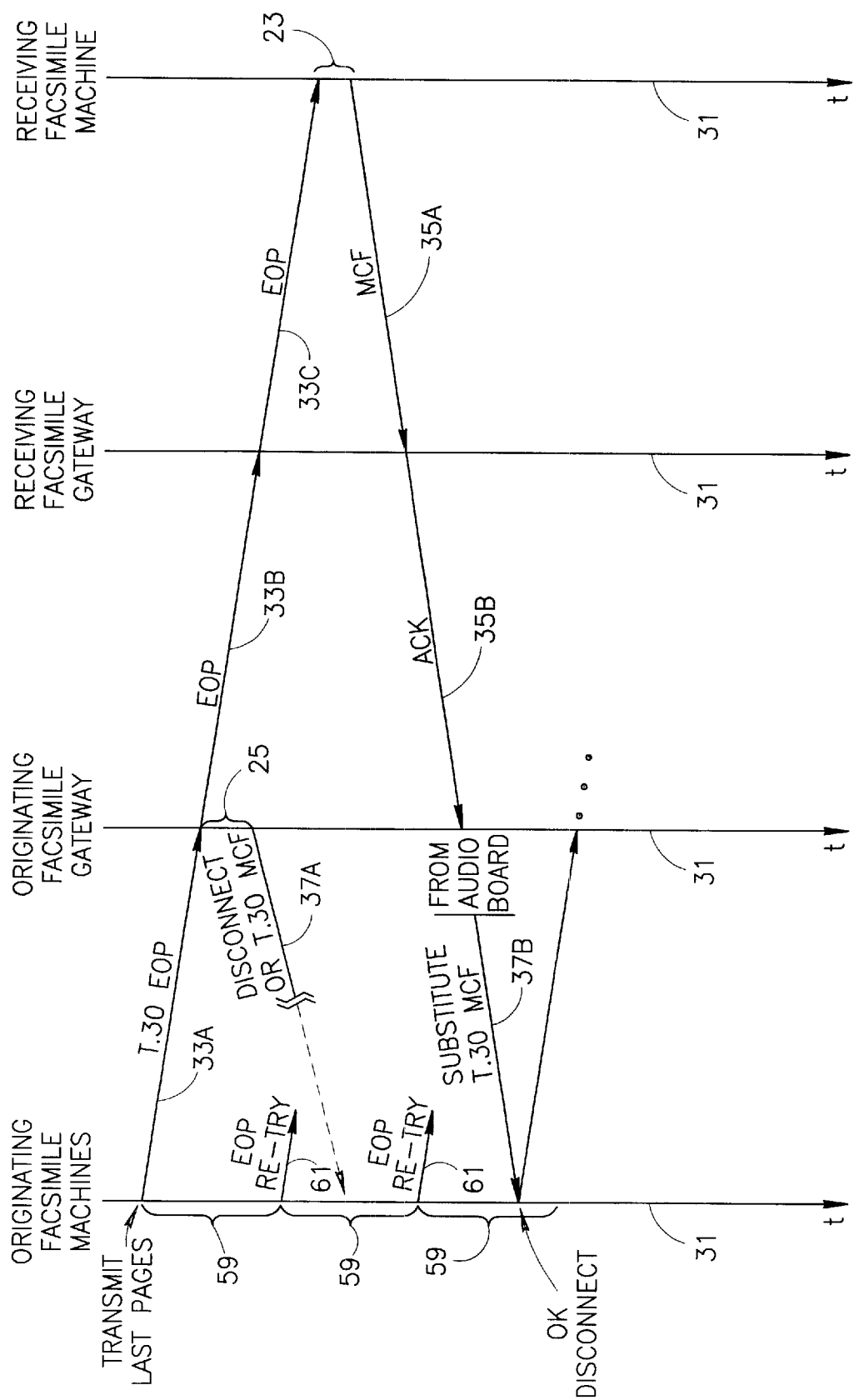
FIG. 2 is a flow diagram of a typical message sequence for the facsimile transmission system of FIG. 1.

FIG. 2 illustrates a typical end of process message sequence and the associated delays. The vertical lines 31 represent the components (e.g., originating fax machine) listed above the respective lines. The downward direction along the lines 31 indicates elapsed time, When the last page of a fax transmission has been sent, the originating fax machine 22A (FIG. 1) sends an End Of Process ("EOP") message 33A to the originating facsimile gateway 20A. The originating facsimile gateway 20A sends an EOP message 338 to the receiving facsimile gateway 20B via the packet network 26. After the receiving facsimile gateway 20B sends all of the data associated with the call to the receiving fax machine 22B (note that data may have been buffered due to the delays in the packet network 26), the receiving facsimile gateway 20B sends an EOP message 33C to the receiving fax machine 22B.

Each step in this process takes a certain amount of time (as indicated by the flow down the time line). At the receiving fax machine 22B, a delay 23 of approximately six seconds may be incurred related to the processing of the EOP 33C. If the entire fax was received, the receiving fax machine 22B sends a confirmation ("MCF 35A") that is sent through the packet network ("ACK 35B") toward the originating fax machine 22A. In practice, the ACK 35B may be sent by any processing entity (e.g., receiving facsimile entity 67) connected to (or within) the packet network 26 that processes facsimile messages and can confirm the reception of a facsimile message. The operations at the originating facsimile gateway 20A will now be discussed in detail in conjunction with FIG. 3.

In order to maintain a transparent behavior at both ends (i.e., at the originating and receiving fax machines), the real-time fax gateway must maintain the fax protocol with all the appropriate notifications. The fax must be received by the receiving fax machine in full accordance with the fax pages sent by the originating fax machine. And the entire fax must be confirmed with an MCF signal 37 (FIG. 2).

The fax gateway 20 (FIG. 3) includes conventional fax/modem processing components (e.g., a fax/modem board 28) and audio processing components (e.g., an audio board 30). These boards cooperate with the PSTN interface 27 and the network interface 29 (FIG. 1) to establish two T.30 facsimile sessions. One session is established between the originating facsimile machine 22A and the originating facsimile gateway 20A and the other session is established between the receiving fax machine 22B and the receiving facsimile gateway 20B (FIG. 1). The fax/modem 28 implements most of the T.30 protocol functions to pass the messages between the originating and receiving fax machines 22.

To extend the timing during the message acknowledgment procedure, a message controller 32 in the gateway 20 monitors the messages originating from the fax machines 22. The fax/modem 28 is controlled by a control application 41 executed by the message controller 32. The control application 41 and the fax/modem communicate using Class II, III, 2.0 or higher messages via a communications driver 39 that interfaces to a software driver (not shown) for the fax/modem 28. These drivers cooperate to provide an indication to a control application 41 that an AT command representing the EOP 33A has been received by the fax/modem 28.

After the facsimile gateway 20A sends the EOP 33B, the facsimile gateway 20A disconnects the fax/modem 28 from the line 38 to the PSTN interface 27. Thus, in the event of a time-out 25 (FIG. 2), the time-out procedures performed by the fax/modem 28 will not affect the originating fax machine 22A. For example, the originating fax machine 22A will not receive an indication that the fax/modem 28 disconnected 37A and went on-hook. Alternatively, the T.30 MCF confirmation 37A (the "false acknowledgment") that the fax/modem 28 may send would be effectively intercepted.

To accomplish the disconnection, the gateway 20 includes a switch 36 that can connect the line 38 to either the fax/modem 28 or the audio board 30. The switch 36 is controlled by the message controller 32 via the switch control driver 43. To send a "manual confirmation," the switch connects the audio board 30 to the line 38. As discussed in more detail below, under the control of the message controller 32 (via the audio board driver 45), the audio board 30 provides an acknowledgment 37B to the originating fax machine 22A after the acknowledgment 35B is received.

The acknowledgment 37B originates from the message controller 32 which includes a stored message 40 that emulates the confirmation message that the originating fax machine 22A expects to receive. This message may be created by recording a known confirmation message (i.e., a T.30 MCF message). Alternatively, the message 40 may be created using an appropriate algorithm, by generating a table or by other methods.

Figure 3:
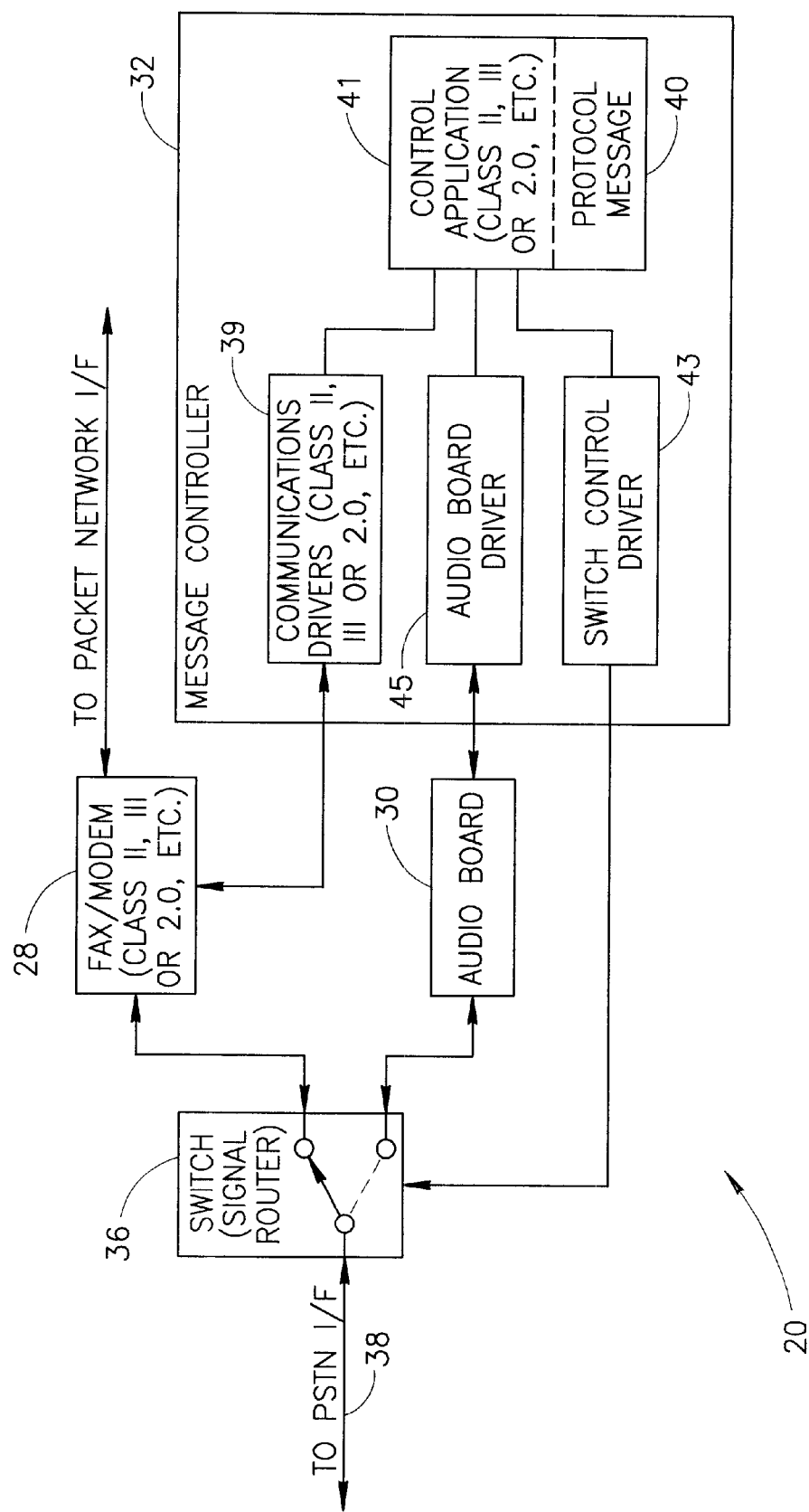
FIG. 3 is a block diagram of one embodiment of a real-time facsimile gateway constructed according to the invention.
Figure 4:
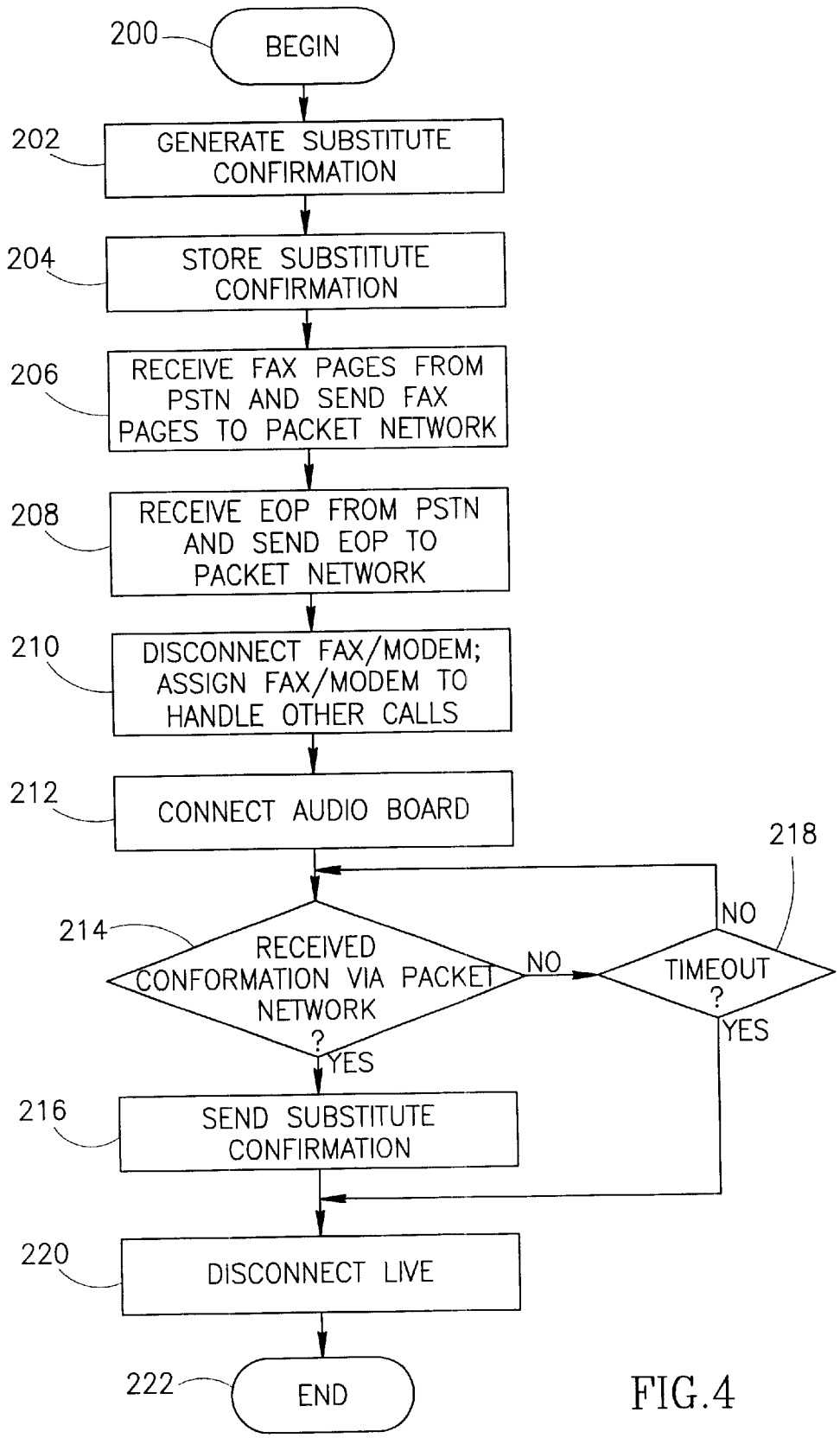
FIG. 4 is a flowchart illustrating facsimile transmission operations that may be performed by the system of FIG. 3.

With the above overview in mind, FIG. 4 describes an exemplary operation of an originating facsimile gateway 20A (as represented by FIGS. 1 and 3) beginning at block 200. Blocks 202 and 204 describe a message initialization procedure that typically is performed only once. At block 202, a substitute confirmation message is generated. As discussed above, this message may include the audio tones or the signals that make up the confirmation messages. At block 204, this message is stored in a data memory (e.g., protocol message 40, FIG. 3) in the gateway 20.

The remaining blocks describe procedures that may be performed for each fax call. At block 206, the originating fax machine 22 (FIG. 1) sends the pages of a fax message to the gateway 20A (FIG. 1) via the PSTN 24. The gateway 20A processes these pages and sends them to the packet network 28.

At block 208, the originating fax machine 22A sends the EOP 33A to the gateway 20A (FIG. 1) via the PSTN 24. The gateway 20A sands the EOP 33B to the packet network 26 and notifies the control application 41 (FIG. 3) as discussed above.

At blocks 210 and 212, the signal router 36 disconnects the fax/modem 28 from the line 38 and connects the audio board 30 to the line 38. As used herein, the terms "disconnect" and "connect" generally refer to the rerouting of the signal path for the originating fax machine 22A and do not necessarily refer to the traditional telephony concepts of disconnecting and connecting. For example, when the line 38 is an analog line, the signal router 36 holds the line 38 and transfers where the data flows (e.g., to and from the audio board 30 rather than the fax/modem 28).

At this time, the fax/modem 28 is free to process other calls. Thus, the signal router 36 may connect the fax/modem 28 to another fax machine. For example, this may be accomplished using a multi-channel switch (not shown) or using time-slot-based signal routing as discussed below.

If the confirmation 35B is received (block 214), the process proceeds to block 216 and the substitute confirmation 37B (from the protocol message 40) is sent to the originating fax machine 22A. In practice, the substitute confirmation 37B may be sent more than once to ensure that it is received by the originating fax machine 22A, if the confirmation is not received, the process proceeds to block 218 to determine whether the confirmation is over due (i.e., has a time-out occurred). Typically, the originating fax machine 22A will send the EOP three times if it has not received a confirmation. After a delay 59 of approximately six seconds, the originating fax machine 22A will send a re-try 61. After the last delay 59, the fax machine 22A aborts the current call. If a time-out has not occurred, the process returns to block 214.

If a time-out has occurred or if the substitute confirmation 37B was sent at block 216, the process proceeds to block 220 where the gateway 20A disconnects the line to the originating fax machine 22A. The process then terminates at block 222.

Figure 5:
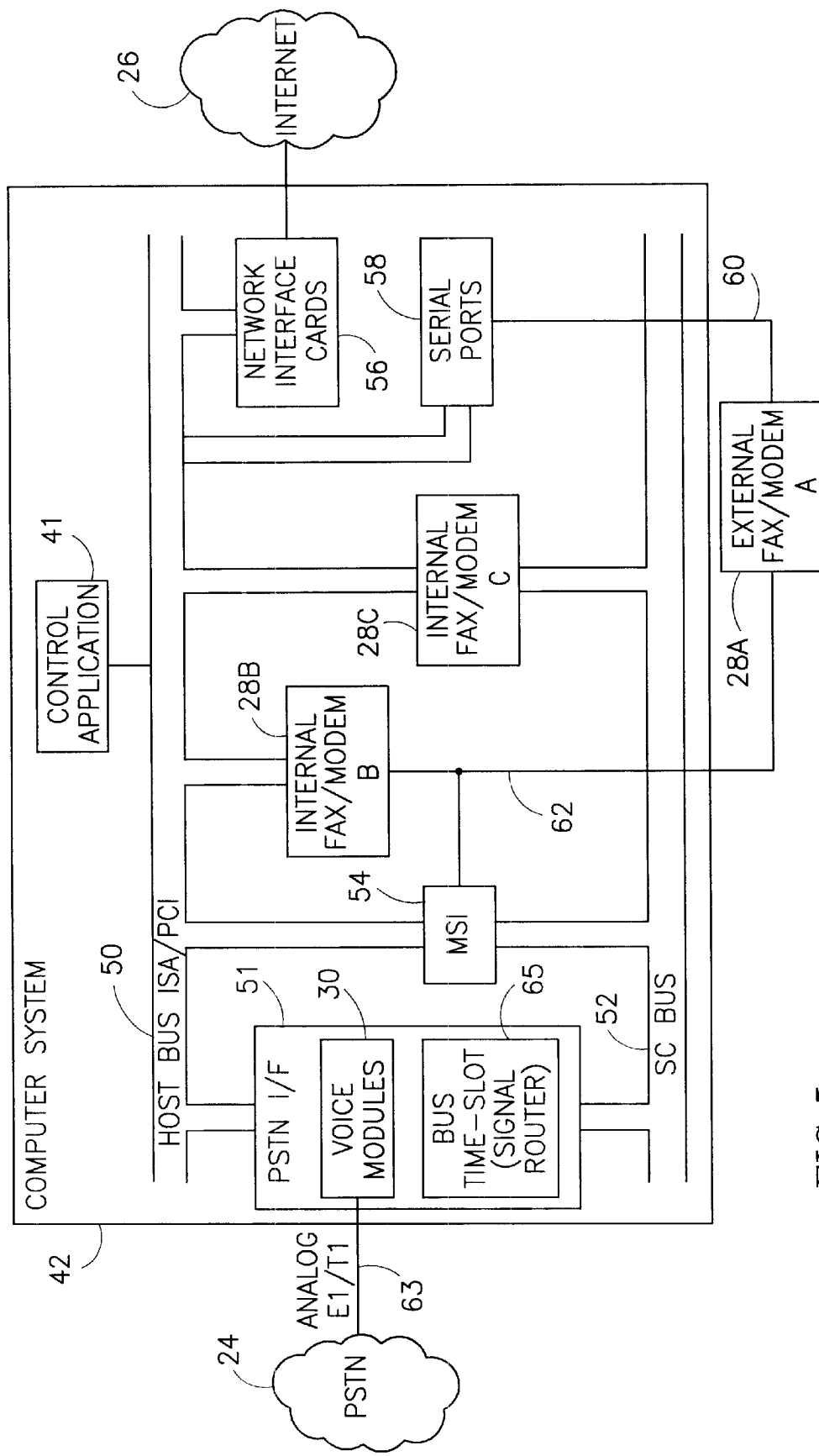
FIG. 5 is a block diagram of another embodiment of a real-time facsimile gateway constructed according to the invention.

FIG. 5 illustrates a typical implementation of the invention. A computer system 42 distributes signals over a host bus 60 and an SC bus 52. A PSTN interface 51 connects to the PSTN 24 via E1, T1 or analog lines 63. The PSTN race 51 may be implemented, for example, with a Dialogic board, model number D/160SC-LS-REV2 (analog) or D/240SC-T1-REV2 (T1). This card also provides the functionality of the audio device 30 discussed above. An MSI board 54 provides the functionality of the switch 36 discussed above. The MSI board may be supplied by Dialogic as well. A network interface card 56 provides the functionality of the packet network interface 29 discussed above. The internal fax/modems 28 are implemented using Rocketmodem boards by Comtrol. The network card may be a 10BaseT Ethernet card sold by 3Com. Serial ports 58, a serial bus 60 and internal analog lines 62 also are provided for communication within the system, in general, the components described above are available from a variety of vendors any of which may be suitable provided that they conform to the protocol and other standards utilized in the particular configuration. As the embodiment of FIG. 5 illustrates, the components used in the invention may be implemented in a variety of ways. For example, the tax/modem and audio components may be implemented on integrated circuits that are incorporated into various boards. The audio boards may be digital or analog. The switching function may be provided by a PBX, central office equipment or other analog or digital switching equipment. This equipment may be part of the gateway or external to the gateway. Alternatively, a separate switch may be omitted as discussed below.

Several of the components depicted in FIG. 5 may or may not be needed depending on the system requirements. For example, three different fax/modem options are depicted (fax/modems 28A. 28B and 28C). The MSI may not be needed when the internal fax modem 28C is used. In this case, the muting of facsimile messages between the PSTN 24 and the fax/modem 28 or the voice module 30 is based on the time-slot assignments for these components on the SC bus 52. Thus, the switching function is performed by bus time-slot routers 65 in the interface (not shown) for the SC bus.

As would be apparent to one skilled in the art, the embodiment of FIG. 5 may be configured in various ways according to the system requirements. Boards may be added as needed to support multiple fax machines, different PSTN lines, different packet protocols and so forth. Different buses may be used. For example, instead of the SC bus, other digital busses may be used including an MVIP bus, an S-100 bus, etc, As described above, the signal source 30 may be implemented in a variety of ways. For example, it may be implemented using an audio board, an audio chip, or as a digitized signal stored a data memory (e.g., a RAM).

Finally, the software programming required to implement many of the above described functions are well known in the art. For example, details of the Class 11 commands may be found in the AT Command Reference Manual. References for the Dialogic boards discussed above include the MSI/SC Software Reference for Windows NT and the Dialogic Native NT Architecture—Beta 1, Release Reference.

From the above, it may be seen that the invention provides an effective method for facsimile transmission over packet networks, in particular, a system constructed according to the invention may provide real-time facsimile transmission over packet networks by only generating a single simple message. The message may be created and stored in advance. Moreover, this message is only sent when there is an acknowledgment. Errors are handled by simply disconnecting the line (in the traditional sense).

Significantly, by using a signal source other than the fax/modem to provide the confirmation, the fax/modem may be used to handle other calls while the gateway waits for the confirmation from the receiving fax machine. Thus, once the fax/modem is disconnected from the originating fax machine for the current call, the fax/modem may connected to another fax machine to handle another call.

In addition, the application running on the gateway only needs to use high-level messages (Class II or Class 2.0 and above, e.g., Class III) to communicate with the fax/modem. Thus, the application does not have to interpret and process relatively complex low-level messages (e.g., Class I).

Furthermore, the system can handle long delays (nominally 18 seconds). This allows the system to operate over reliable protocols (e.g., TCP/IP) that may have relatively long associated delays. Thus, the system may use relatively poor quality transmission media.

While certain specific embodiments of the invention are disclosed as typical, the invention is not limited to these particular forms, but rather is applicable broadly to all such variations as fall within the scope of the appended claims. To those skilled in the art to which the invention pertains many modifications and adaptations will occur. For example, various switching techniques may be used in practicing the invention. Other facsimile and packet protocols may be used. A number of methods can be used to provide the facsimile gateway operations. Similarly, various methods of producing a response to the originating fax machine could be employed to extend the message timing. Thus, the specific structures and methods discussed in detail above are merely illustrative of a few specific embodiments of the invention.

What is claimed is:

1. A facsimile gateway for transmitting facsimile messages from at least one originating facsimile machine over at least one packet-based network to at least one receiving facsimile machine, said facsimile gateway comprising:
    at least one fax/modem operatively coupled to said at least one packet-based network for providing facsimile protocol and for transceiving said facsimile messages;
    at least one signal source for providing facsimile protocol signals to at least one originating facsimile machine;
    a signal router configured for routing said facsimile protocol signals from said at least one fax/modem or said at least one signal source to said originating facsimile machine; and
    a controller in operative communication with said fax/modem, said at least one signal source and said signal router, said controller adapted for:
        monitoring said facsimile protocol signals, said facsimile protocol signal including at least first and second facsimile protocol signals, via said at least one fax/modem;
        controlling said signal router upon the reciving of at least a first facsimile protocol signal from said at least one originating facsimile machine;
        routing said first facsimile protocol signal from said signal source;
        monitoring a fax/modem associated with said receiving facsimile machine for said second facsimile protocol signal; and
        controlling said signal source for generating said second facsimile protocol signal to said at least one originating facsimile machine in accordance with said monitoring.

2. A facsimile gateway according to claim 1 wherein said first facsimile protocol signal is associated with a transmission of a last facsimile page and second facsimile protocol signal is associated with a confirmation that a facsimile message has been transmitted to said at least one receiving facsimile machine.

3. A facsimile gateway according to claim 1 wherein said facsimile protocol signal comprise T.30 MCF signals.

4. A facsimile gateway according to claim 1 further comprising at least one network interface for processing sold facsimile messages for transmission on said at least one packet-based network.

5. A facsimile gateway according to claim 1, wherein said signal router is adapted to respond to a third facsimile protocol signal corresponding to an end of process transmission from said at least one originating facsimile machine, and disconnect a connection from said at least one fax/modem to said at least one originating facsimile machine.

6. A facsimile gateway according to claim 5, wherein said signal router is adapted to establish a connection between said at least one signal source and said at least one originating facsimile machine.

7. A facsimile gateway according to claim 5, wherein said at least one fax/modem is adapted so as to be freed to handle another facsimile session in response to said third facsimile protocol signal.

8. A facsimile gateway according to claim 1 wherein said at least one packet-based network comprises the Internet.

9. A facsimile gateway according to claim 1 wherein said at least one signal source comprises at least one audio device.

10. A method for transmitting facsimile messages over a packet-based network, said method comprising the steps of:
    monitoring facsimile protocol signals for a first facsimile protocol signal from an originating facsimile machine;
    disabling, in response to said monitoring step, facsimile protocol signal flow between a fax/modem and said originating facsimile machine;
    enabling, in response to said monitoring step, an emulated facsimile protocol signal flow between a signal source and said originating facsimile machine;
    monitoring said network for an acknowledgement from at least one receiving facsimile machine; and
    generating, by said signal source, a second facsimile protocol signal, in response to said acknowledgement from said at least one receiving facsimile machine.

11. A method according to claim 10 wherein said first facsimile protocol signal is associated with a transmission of a last page.

12. A method according to claim 10 wherein said second facsimile protocol signal comprises a T.30 MCF signal.

13. A method according to claim 10, wherein said disabling step is in response to an end of process facsimile protocol signal.

14. A method according to claim 10, wherein said enabling step is in response to an end of process facsimile protocol signal.

15. A method according to claim 10 wherein said packet-based network comprises the Internet.

16. A method according to claim 10 wherein said signal source comprises an audio device.

17. A method according to claim 10 further including the step of enabling, in response to said monitoring step, a message flow between said fax/modem and another facsimile machine.

18. A method for transmitting facsimile messages over a packet-based network, said method comprising the steps of:
monitoring said facsimile protocol signals for an end of message indication;
intercepting a first confirmation from a fax/modem in response to said monitoring step;
monitoring said facsimile messages for a second confirmation from a receiving facsimile machine; and
sending an emulated confirmation protocol signal generated by a signal source to an originating facsimile machine in response to said second confirmation.

19. A method according to claim 18 further comprising the step of disconnecting a connection from said fax/modem to said originating facsimile machine in response to said monitoring step.

20. A method according to claim 19 further comprising the step of establishing a connection between a message generator and said originating facsimile machine.

21. A method according to claim 19 wherein said second confirmation is sent by said network.

22. A method according to claim 19 wherein said second confirmation is sent by a receiving facsimile entity.

23. A method according to claim 19 wherein said second confirmation is sent by a receiving facsimile machine.

24. A method according to claim 19 wherein said end of message indication comprises an EOP facsimile protocol signal.

25. A method according to claim 19, wherein said emulated confirmation protocol signal comprises a T.30 MCF signal.

26. A method for transmitting a facsimile message in real-time using high-level messages consisting of class II and above control messages, said facsimile messages being transmitted over a packet-based network said method comprising the steps of:
providing a communication session between an originating facsimile machine and an originating facsimile gateway, wherein said originating facsimile gateway is in communication with a fax/modem using high-level control messages;
transmitting a facsimile protocol signal over said packet-based network in real-time; and
providing a confirmation to said originating facsimile machine in real-time by emulating a confirmation facsimile protocol signal in response to a confirmation from a receiving facsimile machine.

27. A method according to claim 26 wherein said facsimile entity comprises a facsimile machine.

28. A method according to claim 26 further comprising the step of intercepting a confirmation from said originating facsimile gateway in response to said control messages.

29. The facsimile gateway of claim 1, wherein said at least one originating facsimile machine includes at least one sending facsimile machine.

30. A facsimile gateway for transmitting facsimile messages from at least one originating facsimile machine in communication with a fax modem associated therewith, over at least one packet-based network, to at least one receiving facsimile machine, said facsimile gateway comprising:
a signal router adapted for communication with said fax modem;
a controller in communication with said signal router and for communication with said fax modem, said controller configured for:
monitoring facsimile protocol signals associated with said at least one originating facsimile machine;
monitoring said network for a receipt of said facsimile message at said at least one receiving facsimile machine; and
controlling said signal router in accordance with the monitoring of facsimile protocol signals and the monitoring of said network; and
a signal generator configured for generating signals emulating confirmation signals that said facsimile message has been received at said at least one receiving facsimile machine, said signals that emulate confirmation signals being generated in accordance with the monitoring of said network.

31. The gateway of claim 30, wherein said controller configuration for controlling said signal router in accordance with the monitoring of facsimile protocol signals and the monitoring of said network includes circuitry configured for signaling said signal router to disable message flow between said at least one originating facsimile machine and said fax modem associated therewith.

* * * * *

UNITED STATES PATENT AND TRADEMARK OFFICE
CERTIFICATE OF CORRECTION

PATENT NO. : 6,259,538 B1
DATED : July 10, 2001
INVENTOR(S) : Rami Amit et al.

It is certified that error appears in the above-identified patent and that said Letters Patent is hereby corrected as shown below:

<u>Title page,</u>
Item [75], Inventor, change "Alon Cohen, Rison Le-Zion (IL)" to -- Alon Cohen, Rishon Le-Zion (IL) --

Signed and Sealed this

Ninth Day of April, 2002

*Attest:*

*Attesting Officer*

JAMES E. ROGAN
*Director of the United States Patent and Trademark Office*